US010572064B2

(12) United States Patent
Hong et al.

(10) Patent No.: US 10,572,064 B2
(45) Date of Patent: Feb. 25, 2020

(54) TOUCH SENSOR AND METHOD OF DETECTING TOUCH BY USING THE SAME (71) Applicant: Samsung Display Co., Ltd., Yongin-si (KR)

(72) Inventors: Won Ki Hong, Yongin-si (KR); Won Sang Park, Yongin-si (KR); Eun Jin Sung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 20 days.

(21) Appl. No.: 15/617,196

(22) Filed: Jun. 8, 2017

(65) Prior Publication Data
US 2017/0371489 A1 Dec. 28, 2017

(30) Foreign Application Priority Data
Jun. 22, 2016 (KR) .................. 10-2016-0078251

(51) Int. Cl.
G09G 1/00 (2006.01)
G06F 3/041 (2006.01)
G06F 3/045 (2006.01)
G06F 3/044 (2006.01)

(52) U.S. Cl.
CPC ............ G06F 3/0418 (2013.01); G06F 3/044 (2013.01); G06F 3/045 (2013.01); G06F 3/0414 (2013.01); G06F 2203/04102 (2013.01)

(58) Field of Classification Search
CPC . G06F 3/045; G06F 3/044; G06F 1/16; G06F 3/01; G06F 1/163; G06F 3/013
See application file for complete search history.

(56) References Cited

U.S. PATENT DOCUMENTS

| 7,511,702 | B2 | 3/2009 | Hotelling | |
|---|---|---|---|---|
| 7,538,760 | B2 | 5/2009 | Hotelling et al. | |
| 8,654,524 | B2 | 2/2014 | Pance et al. | |
| 8,686,952 | B2 | 4/2014 | Burrough et al. | |
| 8,787,006 | B2 | 7/2014 | Golko et al. | |
| 9,274,660 | B2 | 3/2016 | Bernstein et al. | |
| 2012/0133621 | A1* | 5/2012 | Kim ................... | H04M 1/0206 345/204 |
| 2013/0169520 | A1* | 7/2013 | Cho ...................... | G06F 3/0488 345/156 |
| 2014/0028575 | A1 | 1/2014 | Parivar et al. | |
| 2014/0085213 | A1 | 3/2014 | Huppi et al. | |
| 2014/0091857 | A1 | 4/2014 | Bernstein | |
| 2014/0092064 | A1* | 4/2014 | Bernstein ............... | G06F 3/016 345/174 |
| 2014/0293145 | A1 | 10/2014 | Jones et al. | |
| 2014/0347407 | A1* | 11/2014 | Wang ..................... | G02F 1/167 345/690 |

* cited by examiner

Primary Examiner — Michael A Faragalla
(74) Attorney, Agent, or Firm — H.C. Park & Associates, PLC (57) ABSTRACT A touch sensor, and method of operating same, includes: a flexible substrate capable of being bent into curved or flat shapes; a plurality of pressure sensors provided on the substrate; and a sensor controller configured to determine a bent form of the substrate by using a first detection signal obtained from at least one of the plurality of pressure sensors and to compensate for an intensity of touch by generating a signal based upon the bent form of the substrate.

14 Claims, 9 Drawing Sheets

TOUCH SENSOR AND METHOD OF DETECTING TOUCH BY USING THE SAME

CROSS-REFERENCE TO RELATED APPLICATION

This application claims priority from and the benefit of Korean Patent Application No. 10-2016-0078251, filed on Jun. 22, 2016, which is hereby incorporated by reference for all purposes as if fully set forth herein.

BACKGROUND

Field

The invention relates generally to a touch sensor and a method of detecting a touch by using the same, and more particularly, to a touch sensor for a flexible display having pressure sensors to detect the intensity of a touch regardless of the degree or direction of bending of the substrate.

Discussion of the Background

Due to an increase in interest in information displays and an increase in demand for use of portable information media, research on and commercialization of display devices have increased in intensity.

A recent display device includes a touch sensor for receiving a touch of a user together with an image display function. Accordingly, a user is capable of more conveniently using the display device through the touch sensor.

Further, recently, display devices tend to provide various functions to a user by using a pressure generated by a touch, as well as the position of the touch. Moreover, display devices having flexible display panels are becoming more prevalent.

The above information disclosed in this Background section is only for enhancement of understanding of the background of the inventive concepts, and, therefore, it may contain information that does not form the prior art that is already known in this country to a person of ordinary skill in the art.

SUMMARY

Applicants have discovered that the accuracy and uniformity of pressure sensors capable of detecting the intensity of a touch varies in flexible display panels according to whether the touch is applied to a convex, concave or flat portion of the flexible display.

Touch sensors constructed according to the principles of the invention are capable of more uniformly and accurately recognizing the intensity of the touch applied by a user regardless of whether the flexible substrate is bent into a convex, concave or a flat shape.

Additional aspects will be set forth in the detailed description which follows, and, in part, will be apparent from the disclosure, or may be learned by practice of the inventive concepts.

According to one aspect of the invention, a touch sensor includes: a flexible substrate capable of being bent into curved or flat shapes; a plurality of pressure sensors provided on the substrate; and a sensor controller configured to determine a bent form of the substrate by using a first detection signal obtained from at least one of the plurality of pressure sensors and to compensate for an intensity of touch by generating a signal based upon the bent form of the substrate.

The sensor controller may include: a sensor detecting unit configured to receive the first detection signal output from the at least one pressure sensor; and a substrate shape determining unit configured to obtain information relating at least one of an amount of curvature and a bending direction of the substrate from the first detection signal received by the sensor detecting unit.

The sensor controller may further include a sensor driver, which supplies a driving voltage to the plurality of pressure sensors, and the driving voltage is compensated based upon the information relating to at least one of the amount of curvature and the bending direction of the substrate.

The substrate may be bendable into a shape have at least one of a flat area, a convexly bent area, and a concavely bent area, and the sensor driver is configured to supply a reference driving voltage to a first pressure sensor positioned in the flat area of the substrate.

The sensor driver may be configured to supply a first compensated driving voltage to a second pressure sensor positioned in the convexly bent area of the substrate, and the first compensated driving voltage may be larger than the reference driving voltage.

The convexly bent area may include a first sub area having a first curvature and a second sub area having a second curvature smaller than the first curvature, and the sensor driver is configured to supply a first compensated driving voltage to the first sub area and the second sub area with the first compensated driving voltage supplied to the first sub area being larger than that supplied to the second sub area.

The sensor driver is configured to supply a second compensated driving voltage to a third pressure sensor positioned in the concavely bent area of the substrate, and the second compensated driving voltage may be smaller than the reference driving voltage.

The concavely bent area may include a first sub area having a first curvature and a second sub area having a second curvature smaller than the first curvature, and the sensor driver is configured to supply a second compensated driving voltage to the first sub area and to the second sub area with the second compensated driving voltage supplied to the first sub area being smaller than that supplied to the second sub area.

The sensor controller may be configured to determine whether positions of the substrate are flat, concave, or convex.

The sensor controller may further include a calculating unit configured to calculate the intensity of touch by based upon a second detection signal output from the pressure sensor, the second detection signal being different from the first detection signal, and to calculate a final intensity of touch based upon a correction constant corresponding to the information relating to at least one of the intensity of touch, the curvature of the substrate, and the bending direction of the substrate.

The substrate may be bendable into a convex shape and when the touch is applied to a convexly bent area of the substrate, the intensity of touch is smaller than the final intensity of touch.

The substrate may be bendable into a concave shape and when the touch is applied to the concavely bent area of the substrate, the intensity of touch is larger than the final intensity of touch.

The touch sensor may further include a supporting film provided on the substrate, and including unit cells to maintain the bent form of the substrate.

The unit cell may include: a first electrode; a second electrode spaced apart from the first electrode; and a fluid layer provided between the first electrode and the second electrode, and wherein the fluid layer may be hardened when a voltage is applied to the first electrode and the second electrode.

According to another aspect of the invention, a method of detecting a touch by using pressure sensors positioned on a flexible substrate, the method includes: determining a bent form of the substrate by using a first detection signal obtained from the pressure sensor, the first detection signal being the output signal of the pressure sensor at the time when the substrate is bent without a touch input; applying a compensated driving voltage to the pressure sensor in response to the bent form of the substrate; obtaining a second detection signal from the pressure sensor when a touch is applied to the substrate; and calculating an intensity of touch by using the second detection signal.

The bent form of the substrate may be determined by referring to the bending direction of the substrate and/or an amount of curvature of the substrate.

The step of applying a compensated driving voltage may further include: applying a reference driving voltage may be supplied to a pressure sensor positioned in a flat area of the substrate, applying a first compensated driving voltage larger than the reference driving voltage, to a pressure sensor positioned in a convexly bent area of the substrate, and applying a second compensated driving voltage smaller than the reference driving voltage, to a pressure sensor positioned in a concavely bent area of the substrate.

According to yet another aspect of the invention, a touch sensor includes: a flexible substrate bendable into a shape having at least one of a flat area, a convexly bent area, and a concavely bent area; first pressure sensors disposed in the flat area, second pressure sensors disposed in the convexly bent area, and third pressure sensors disposed in the concavely bent area; a sensor controller configured to determine a bent form of the substrate based upon a first detection signal obtained from the second and third pressure sensors, apply a compensated driving voltage to the second and third pressure sensors in response to the bent form of the substrate, obtain a second detection signal from the pressure sensor when a touch is applied to the substrate, and calculate an intensity of touch based upon the second detection signal.

The first detection signal may be the output signal of the pressure sensor at the time when the substrate is bent without a touch input.

The sensor controller may be configured to apply a reference driving voltage to a first pressure sensor in the flat area, a first compensated driving voltage to the second pressure sensor in the convexly bent area, and a second compensated driving voltage to a third pressure sensor in the concavely bent area.

According to the principles of the invention, it is possible to provide the touch sensor which is capable of recognizing an intensity of touch.

According to the principles of the invention, it is possible to provide the touch sensor, which is capable of uniformly and more accurately recognizing an intensity of touch regardless of a whether the substrate is bent into various shapes.

According to the principles of the invention, it is possible to decrease power consumption by applying a low driving voltage to a concavely bent area of the substrate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, touch sensors constructed according to the principles of the invention, and methods of detecting a touch by using the same are described with reference to the exemplary embodiments of the disclosure and relevant drawings.

Figure 1:
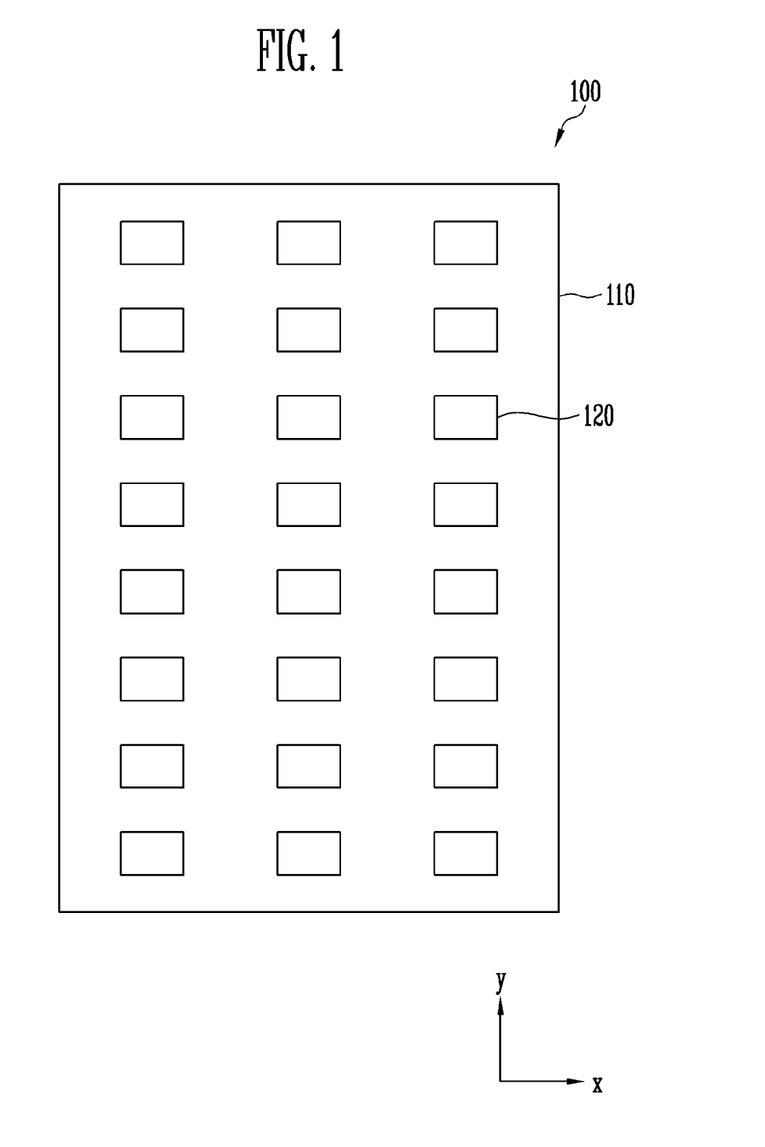
FIG. 1 is a plan view schematically illustrating a touch sensor having pressure sensors constructed according to the principles of the invention.

FIG. 1 is a plan view schematically illustrating a touch sensor having pressure sensors constructed according to principles of the invention.

Referring to FIG. 1, a touch sensor 100 constructed according to the principles of the invention may include a substrate 110, and a plurality of pressure sensors 120. As used herein "touch sensor" refers to any device capable of sensing one or more inputs by a user applied to a surface of the sensor and may, for example, take the form of a touch screen panel incorporated with a display panel or other device currently or later known in the art.

The substrate 110 may be flexible, stretchable, foldable, bendable, or rollable.

Further, the substrate 110 is flexible, stretchable, foldable, bendable, or rollable over all its surface area, so that the entire touch sensor 100 may be flexible, stretchable, foldable, bendable, or rollable.

The substrate 110 may be formed of an insulating material, such as glass and resin. Further, the substrate 110 may be formed of a material having flexibility so as to be bendable or foldable, and may also have a single-layer structure or a multi-layer structure.

For example, the substrate 110 may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, cellulose acetate propionate, cyclo olefin polymer (COP), and a cyclo olefin copolymer (COC).

Next, the pressure sensors 120 according to one or more exemplary embodiments may be positioned on one surface of the substrate 110. That is, the pressure sensors 120 may also be positioned on an upper surface of the substrate 110, and/or may be positioned on a lower surface of the substrate 110.

When the pressure sensors 120 are activated by a touch, the pressure sensors 120 may detect the touch, and a sensor controller, described below, may detect the intensity (magnitude) of pressure applied by the touch and the like by using signals output from the pressure sensors 120.

For convenience of the description, FIG. 1 illustrates an example case where the pressure sensors are arranged in 3 columns and eight rows such that three pressure sensors 120 are disposed in a horizontal direction (x-axis direction) and eight pressure sensors 120 are disposed in a vertical direction (y-axis direction), but the inventive concepts are not limited thereto, and the number and configuration of pressure sensors 120 included in the touch sensor 100 may be variously changed.

Further, in FIG. 1, the pressure sensors 120 are regularly disposed, but the inventive concepts are not limited thereto.

Further, it is illustrated that the pressure sensors 120 have a quadrangular shape, but the shape of pressure sensors 120 may be variously changed.

In addition, although not illustrated in FIG. 1, the touch sensor 100 may further include a sensor for detecting a variation of capacitance, as is known in the art. Otherwise, the pressure sensor 120 may also perform a function of detecting a variation of capacitance, as well as the intensity of pressure.

Figure 2:
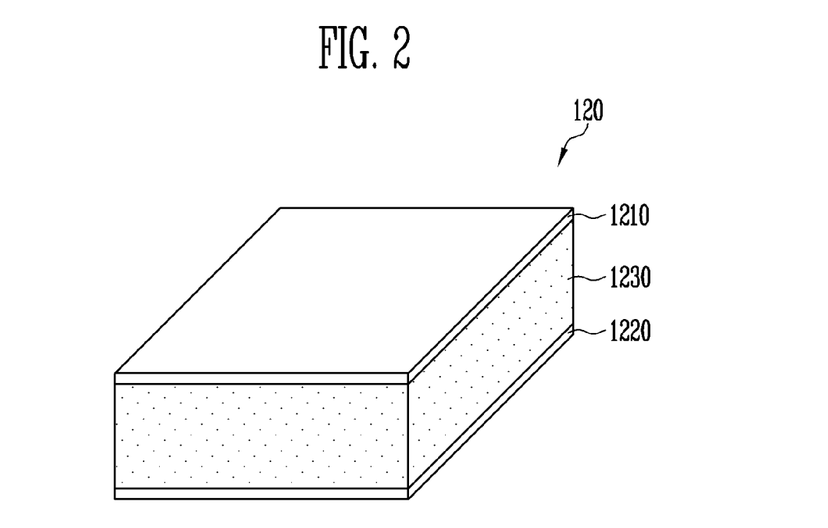
FIG. 2 is a perspective view illustrating an embodiment of the pressure sensor illustrated in FIG. 1.

FIG. 2 is a perspective view illustrating an embodiment of the pressure sensor illustrated in FIG. 1.

Referring to FIG. 2, the pressure sensor 120 may include a first conductor 1210, a second conductor 1220, and a variable resistance factor 1230 provided between the first conductor 1210 and the second conductor 1220.

The first conductor 1210 includes a conductive material. In one or more exemplary embodiments, the conductive material may include a metal or an alloy thereof. The metal may include gold (Au), silver (Ag), aluminum (Al), molybdenum (Mo), chrome (Cr), titanium (Ti), nickel (Ni), neodymium (Nd), copper (Cu), platinum (Pt), and the like.

The first conductor 1210 may be formed of a transparent conductive material. The transparent conductive material may include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide (SnO2), a carbon nano tube, graphene, and the like.

The first conductor 1210 is illustrated in a plate shape in the drawing, but is not limited thereto and may be modified into various shapes. For example, the first conductor 1210 may be configured as a plurality of striped shapes connected with one another or as one or mesh shapes.

Next, the second conductor 1220 is spaced apart from the first conductor 1210 and includes a conductive material. The conductive material may be selected from the materials of the first conductor 1210, and may be formed of the same material as that of the first conductor 1210 or a different material from that of the first conductor 210.

The second conductor 1220 is also illustrated in a plate shape in the drawing, but is not limited thereto and may be modified into various shapes. For example, the second conductor 1220 may have striped shapes connected with one another and intersecting the first conductor 1210 or have one or more mesh shapes.

Next, the variable resistance factor 1230 may be provided between the first conductor 1210 and the second conductor 1220.

The variable resistance factor 1230 is a constituent element having an electric characteristic that is variable according to a degree of transformation, and particularly, may include a material, having a resistance that is changed depending upon the amount of pressure applied from the outside between the first conductor 1210 and the second conductor 1220.

For example, when power provided to the variable resistance factor 1230 is increased, the resistance of the variable resistance factor 1230 may be decreased. Otherwise, in contrast to this, when power provided to the variable resistance factor 1230 is increased, resistance of the variable resistance factor 1230 may also be increased.

The variable resistance factor 1230 may include a material whose resistance is changed according to pressure. For example, the variable resistance factor 1230 may include materials known in the art as a force sensitive material or force sensitive resistor.

The variable resistance factor 1230 may include at least one of piezo-electric materials, such as lead zirconate titanate (PZT) and polyvinylidene fluoride (PVDF), carbon powder, Quantum tunneling composite (QTC), silicon, carbon nano tube, and graphene.

Further, the variable resistance factor 1230 may include nano particles. The nano particles may be provided in a form of a nano tube, a nano column, a nano rod, a nano hole, a nano wire, and the like.

The nano particles may include particles of carbon, graphite, a metalloid, a metal, a conductive oxide of the metalloid or the metal, and a conductive nitride of the metalloid or the metal, or include particles in a core shell structure, in which the particles are coated on an insulating bead or a combination thereof. The semi-metal may include any one of antimony (Sb), germanium (Ge), and arsenic (As), or an alloy thereof. The metal may include a zinc (Zn), aluminum (Al), scandium (Sc), chrome (Cr), manganese (Mn), iron (Fe), cobalt (Co), nickel (Ni), copper (Cu), indium (In), tin (Sn), yttrium (Y), zirconium (Zr), niobium (Nb), molybdenum (Mo), ruthenium (Ru), rhodium (Rh), palladium (Pd), gold (Au), silver (Ag), platinum (Pt), strontium (Sr), tungsten (W), cadmium (Cd), tantalum (Ta), titanium (Ti), or an alloy thereof. The conductive oxide may include an indium tin oxide (ITO), an indium zinc oxide (IZO), an aluminum doped zinc oxide (AZO), a gallium indium zinc oxide (GIZO), a zinc oxide (ZnO), and a mixture thereof.

Figure 3:
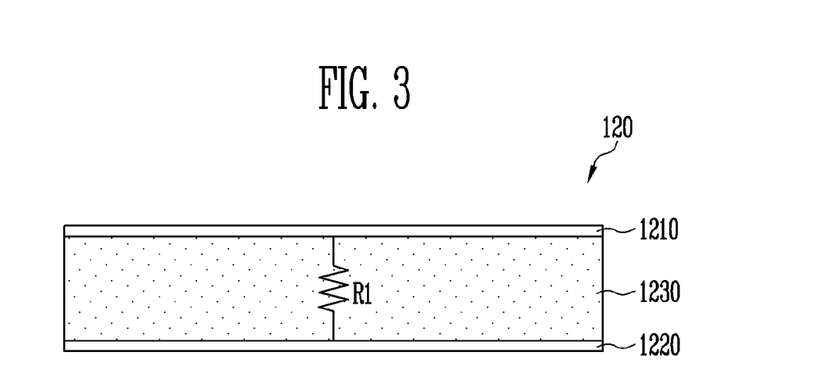
FIGS. 3 and 4 are simplified, cross-sectional views for describing an operation of the pressure sensor illustrated in FIG. 2.
Figure 4:
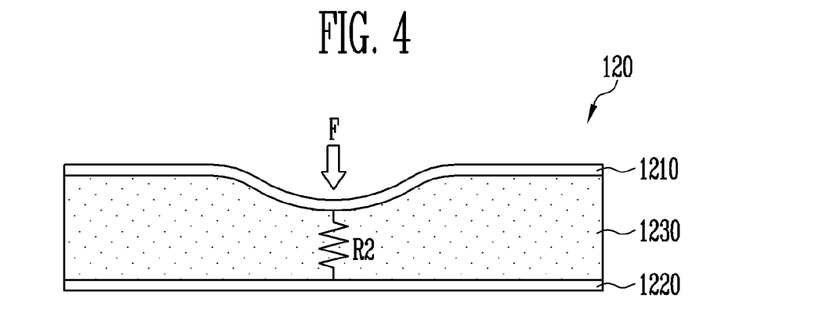

FIGS. 3 and 4 are simplified, cross-sectional views for describing an operation of the pressure sensor illustrated in FIG. 2.

Particularly, FIG. 3 illustrates a state where a pressure is not applied to the pressure sensor 120, and FIG. 4 illustrates a state where a pressure F is applied to the pressure sensor 120.

Referring to FIG. 3, when pressure is not applied to the pressure sensor 120, the first conductor 1210 and the second conductor 1220 are spaced apart from each other by a first distance with the variable resistance factor 1230 interposed therebetween, and the variable resistance factor 1230 may have first resistance R1.

Referring to FIG. 4, when the pressure F is applied to the pressure sensor 120 according to a touch of a user or the like, the distance between the first conductor 121 and the second conductor 1220 may be changed, and thus, the form of the variable resistance factor 1230 may be changed. That is, the amount of resistance of the variable resistance factor 1230 may be changed from the first resistance R1 to second resistance R2. For example, R2 may be greater than R1.

Finally, it is possible to detect the intensity of pressure applied and the like depending upon the degree of change of the resistance.

Further, referring to FIGS. 3 and 4, the first conductor 1210 and the second conductor 1220 may be connected to the sensor controller, described below, through separate wires.

The sensor controller may calculate the pressure F applied from the outside by detecting a variation ΔR of resistance according to the change in the distance between the first conductor 1210 and the second conductor 1220. For example, when the variation ΔR of resistance increases, the intensity of detection signal output from the pressure sensor also increases.

Figure 5:
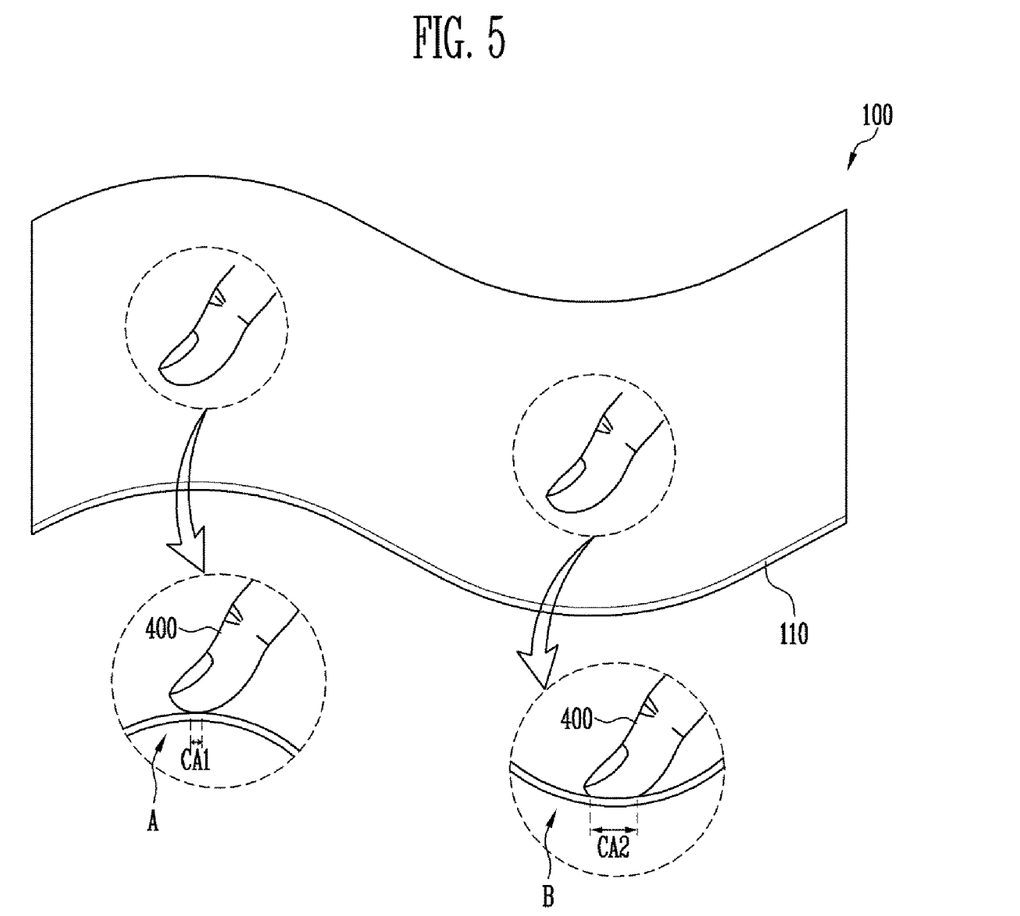
FIG. 5 is a diagram illustrating an example of the case where a touch is applied to bent areas of the touch sensor according to one or more exemplary embodiments.

FIG. 5 is a diagram illustrating an example of the case where a touch is applied to bent areas of the touch sensor according to one or more exemplary embodiments. For convenience of the description, in FIG. 5, the pressure sensor is omitted, and only a schematic shape of the touch sensor 100 is illustrated.

Referring to FIG. 5, the substrate 110 has sufficiently flexibility, so that the substrate 110 may be convexly bent and/or concavely bent in various portions.

When a touch is applied onto the bent substrate 110, a contact area between the substrate 110 and a finger may be varied according to the bent shape of the substrate 110.

For example, when a touch is applied to a convexly bent area A, a contact area CA1 between the substrate 110 and a finger 400 is smaller than a contact area CA2 between the substrate 110 and a finger 400 when a touch is applied to a concavely bent area B.

Furthermore, when a touch is applied to a flat area, a contact area between the substrate 110 and a finger 400 may be larger than the contact area CA1 when a touch is applied to the convexly bent area A, and may be smaller than the contact area CA2 when a touch is applied to the concavely bent area B.

Further, when a touch is applied to an area, which is convexly bent so as to have a first curvature, the contact area CA1 between the substrate 110 and the finger 400 is relatively decreased compared to the case where a touch is applied to an area, which is convexly bent so as to have a second curvature smaller than the first curvature.

In contrast to this case, when a touch is applied to an area, which is concavely bent so as to have a first curvature, the contact area CA2 between the substrate 110 and the finger 400 is relatively increased compared to the case where a touch is applied to an area, which is concavely bent so as to have a second curvature smaller than the first curvature.

That is, the contact area between the substrate 110 and the finger 400 may be changed according to the bending direction and the degree of bending (for example, a curvature) of the substrate 110 representing whether the substrate 110 is convexly bent or concavely bent and the degree of curvature.

In the meantime, the intensity of touch may be calculated by considering the pressure and the touch area of the touch sensor and the finger 400 together. The force applied to the substrate when touching is generally constant regardless of bending degree and/or bending direction of the substrate 100. That is, the intensity of touch may be in proportion to the pressure and the contact area.

Accordingly, when the touch is applied to the convexly bent area, the contact area is decreased, so that the intensity of touch sensed has a smaller value than that of the force actually applied to the substrate 110 by the user.

In contrast to this case, when the touch is applied to the concavely bent area, the contact area is increased, so that the intensity of touch has a larger value than that of the force actually applied to the substrate 110 by the user.

Therefore, according to the principles of the invention, it is necessary to provide the touch sensor 100 with the ability to compensate for the degree and amount of curvature and thereby calculates an intensity of touch having the same value when a touch is applied with the same force regardless of the degree and/or direction of bending of the substrate 110.

Figure 6:
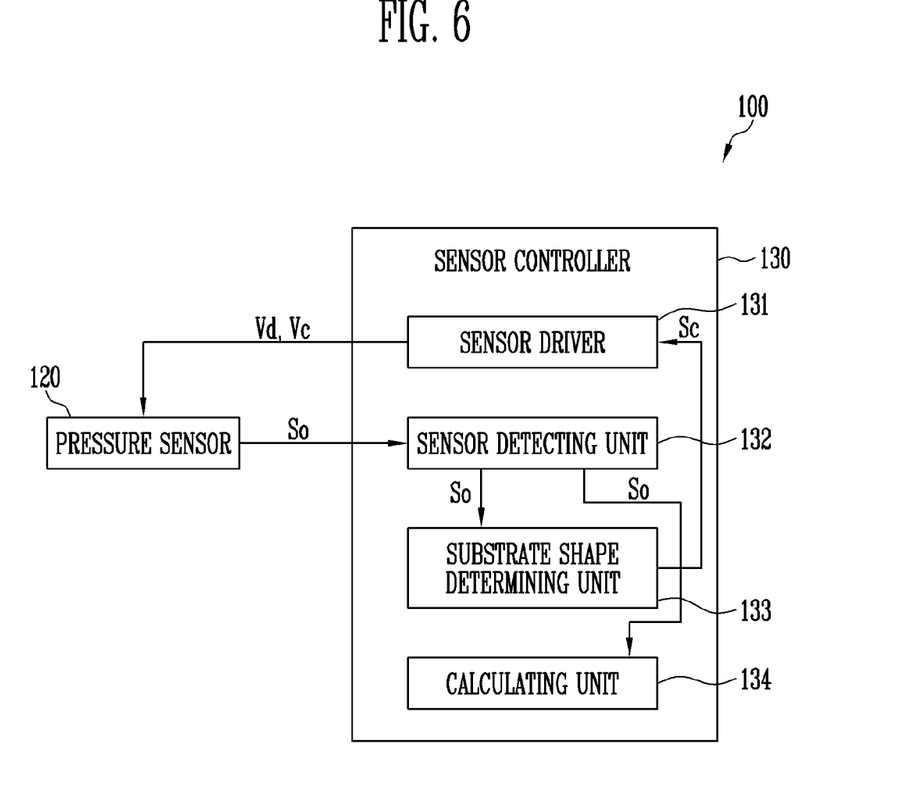
FIG. 6 is a block diagram of the touch sensor illustrating various components including a sensor controller constructed according to the principles of the invention.

FIG. 6 is a block diagram of the touch sensor illustrating various components including a sensor controller constructed according to the principles of the invention.

Referring to FIG. 6, the touch sensor 100 may further include a sensor controller 130.

The sensor controller 130 may include a sensor driver 131, a sensor detector 132, a substrate shape determining unit 133, and a calculating unit 134.

The sensor driver 131 may serve to apply a first driving voltage Vd and/or a second driving voltage Vc to the pressure sensors 120. For example, the sensor driver 131 may apply the first driving voltage Vd and/or the second driving voltage Vc to the second conductors 1220 of the pressure sensors 120.

When the substrate 110 is in a flat state having no bent area, the sensor driver 131 may apply the first driving voltage Vd having the same value to all of the pressure sensors 120.

In contrast to this case, when the substrate 110 is bent, the sensor driver 131 may apply the second driving voltage Vc as a compensated driving voltage with reference to the bent form (i.e., bending degree and/or bending direction) of the substrate 110. For example, the sensor driver 131 may apply a driving voltage having a first value to some of the pressure sensors and apply a driving voltage having a second value to some of the pressure sensors, such that the sensor driver 131 may provide different driving voltages according to the form of the substrate 110.

The sensor detector 132 may receive adjusting signals So output from the pressure sensors 120.

The sensor detector 132 transmits the adjusting signal So to the substrate shape determining unit 133 and/or the calculating unit 134. The substrate shape determining unit 133 may perform a function of determining a bent form of the substrate 110 from the adjusting signal So received by the sensor detecting unit 132. Specifically, the bent form of the substrate 110 may correspond to information relating to the bending direction and bending degree (the direction (concave or convex) and the amount curvature of the substrate of the substrate 110).

The substrate shape determining unit 133 may transmit the compensation signal Sc containing the information corresponding to the particular bent form of the substrate 110 to the sensor driver 131, so that the sensor driver 131 may generate and output the second driving voltage Vc as the compensated driving voltage.

Otherwise, the substrate shape determining unit 133 may generate the compensated driving voltage Vc by referring to the bent form of the substrate 110. Thus, the compensation signal SC may contain information relating to the compensated driving voltage Vc.

A method of determining the bent form of the substrate 110 by using the signal received by the sensor detecting unit 132 is described in detail with reference to FIGS. 7 to 9E below.

Last, the calculating unit 132 may perform the function of calculating a position, an intensity of touch or the like by using the signal received by the sensor detecting unit 132.

Figure 7:
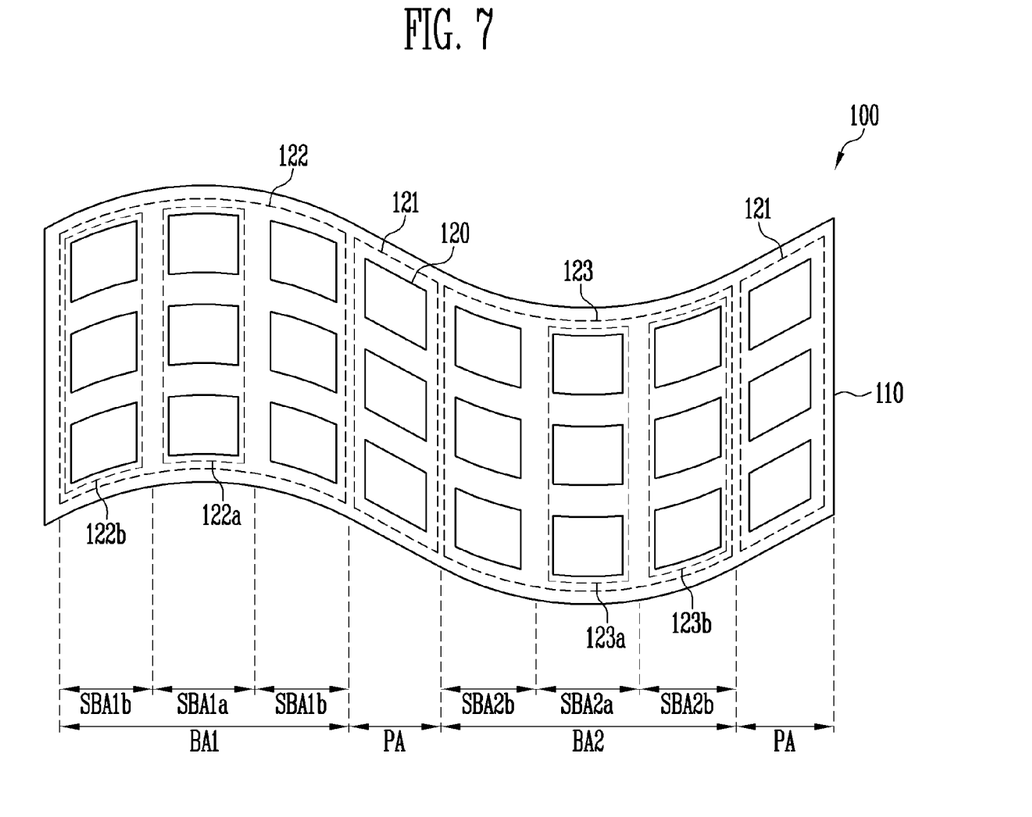
FIG. 7 is a diagram illustrating an example of a bent state of the touch sensor according to one or more exemplary embodiments.

FIG. 7 is a diagram illustrating an example of a bent state of the touch sensor according to one or more exemplary embodiments.

The substrate 110 has sufficient flexibility, so that a user may randomly change a shape of the substrate 110. That is, a shape of the substrate 110 may be variously changed.

However, for convenience of the description, as illustrated in FIG. 7, the invention will be described on an assumption that the pressure sensors 120 are positioned on the substrate 110, and the substrate 110 includes a convexly bent area BA1, a flat area PA, and a concavely bent area BA2.

The convexly bent area BA1 may include a first sub convex area SBA1a bent to have a first curvature, and a second sub convex area SBA1b bent to have a second curvature smaller than the first curvature.

Further, the concavely bent area BA2 may include a first sub concave area SBA2a bent to have a first curvature, and a second sub concave area SBA1b bent to have a second curvature smaller than the first curvature.

Referring to FIG. 7, the pressure sensors 120 may include first pressure sensors 121, second pressure sensors 122, and third pressure sensors 123.

The first pressure sensors 121 may be positioned in the flat area PA of the substrate 110, the second pressure sensors 122 may be positioned in the convex area BA1 of the substrate 110, and the third pressure sensors 123 may be positioned in the concave area BA2 of the substrate 110.

Each of the first pressure sensors 121, the second pressure sensors 122, and the third pressure sensors 123 may be the same as the pressure sensor 120 aforementioned with reference to FIG. 2.

The first pressure sensors 121 are positioned in the flat area PA, where there is no change in a shape of the variable resistance factor.

The second pressure sensors 122 are positioned in the convexly bent area BA1, where the area of the variable resistance factor is increased so as to be wider in area and thinner in depth.

The third pressure sensors 123 are positioned in the concavely bent area BA2, where the variable resistance factor is compressed and becomes narrower in depth.

Accordingly, when the substrate is bent, the second pressure sensors 122 positioned in the convexly bent area BA1 and the third pressure sensors 123 positioned in the concavely bent area BA2 may generate detection signals even if a force generated by a touch is not applied.

Moreover, unlike the illustration of FIG. 7, when the pressure sensors 120 are positioned under the substrate 110, the shape of the variable resistance factors of the second pressure sensors 122 and the shape of the variable resistance factors of the third pressure sensors 123 may be changed to oppositely from the aforementioned shapes.

Hereinafter, when the substrate 110 is bent as illustrated in FIG. 7, a method of determining the bent state of the substrate 110 by the substrate shape determining unit 133 is described with reference to FIGS. 8A to 8E.

FIGS. 8A to 8E are graphs illustrating an example of a waveform of a detection signal obtained from the pressure sensor of FIG. 1. Particularly, FIGS. 8A to 8E are waveforms representing a first detection signal at the time (t1) when the same driving voltage is applied to each of the pressure sensors 120 and no touch is applied to the substrate 110, and the substrate 110 is bent as shown in FIG. 7.

Figure 8A:
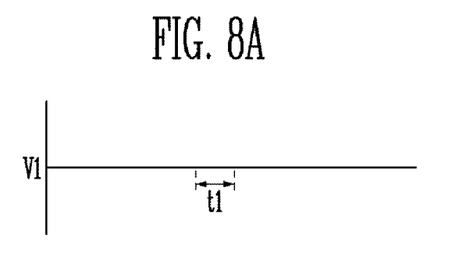
FIGS. 8A to 8E are graphs illustrating an example of a waveform of a detection signal obtained from the pressure sensor of FIG. 1.

First, FIG. 8A represents a detection signal of the first pressure sensors 121, and the detection signal may be a first voltage V1.

Figure 8B:
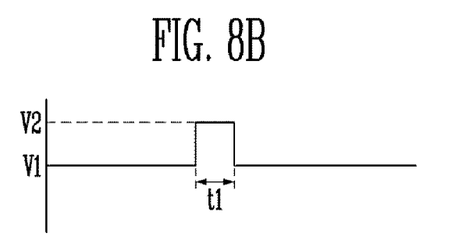
Figure 8C:
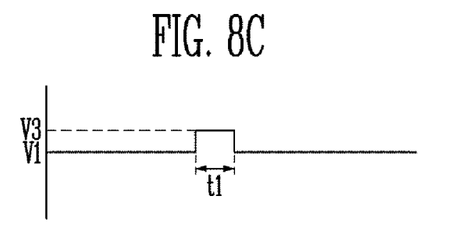

Next, FIGS. 8B and 8C represent detection signals of the second pressure sensors 122. The detection signal of the second pressure sensors 122 may be a second voltage V2 or a third voltage V3.

The substrate 110 is convexly bent, so that the areas of the variable resistance factors of the second pressure sensors 122 are increased to be wide, thereby changing resistance of the variable resistance factors. As explained above, when the variation of resistance increases, the intensity of detection signal output from the pressure sensor also increases. Accordingly, the second pressure sensors 122 output signals having larger values than those of the detection signals of the first pressure sensors 121.

Thus, the value of the detection signal may be changed according to the curvature of the convexly bent area BA1.

FIG. 8B represents the detection signals of the second pressure sensors 122a positioned in the first sub convex area SBA1a, FIG. 8C represents the detection signals of the second pressure sensors 122a positioned in the second sub convex area SBA1b.

Referring to FIGS. 8B and 8C, the values of the detection signals of the second pressure sensors 122a positioned in the first sub convex area SBA1a are larger than the values of the detection signals of the second pressure sensors 122b positioned in the second sub convex area SBA1b.

That is, it can be seen that the pressure sensor positioned in the area having a large curvature has a large change in a resistance value.

Figure 8D:
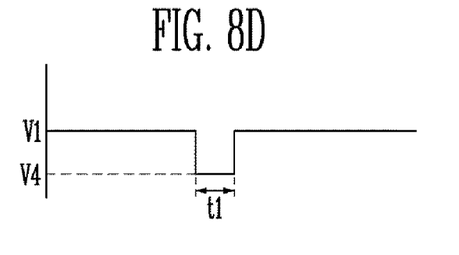
Figure 8E:
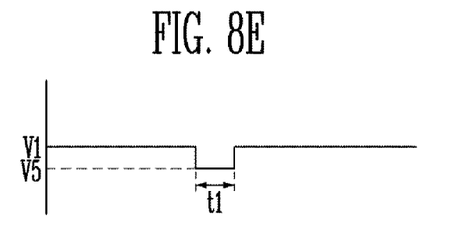

Next, FIGS. 8D and 8E represent detection signals of the third pressure sensors 123. The detection signals of the second pressure sensors 123 may be a fourth voltage V4 or a fifth voltage V5.

The substrate 110 is concavely bent, so that the variable resistance factors of the third pressure sensors 123 are compressed and decreased, thereby changing resistance of the variable resistance factors. That is, the third pressure sensors 123 output signals having smaller values than those of the detection signals of the first pressure sensors 121.

In the meantime, the value of the detection signal may be changed according to a curvature of the concavely bent area BA2.

FIG. 8D represents the detection signals of the third pressure sensors 123a positioned in the first sub concave area SBA2a, and FIG. 8E represents the detection signals of the third pressure sensors 123b positioned in the second sub concave area SBA2b.

Referring to FIGS. 8D and 8E, the detection signals of the third pressure sensors 123a positioned in the first sub concave area SBA2a have larger variations than those of the detection signals of the third pressure sensors 123b positioned in the second sub concave area SBA2b.

That is, it can be seen that the pressure sensor positioned in the area having a large curvature has a large change in resistance value.

As a result, when it is assumed that the detection signals of the first pressure sensors 121 having no change in a resistance value are reference signals, the substrate shape determining unit 133 may determine whether the substrate 110 is convexly or concavely bent from information indicating whether a signal larger or smaller than the reference signal is output. That is, the substrate shape determining unit 133 may determine the bending direction, i.e., convex or concave relative to a reference.

Further, the substrate shape determining unit 133 may determine the degree of bending, which indicates whether the substrate 110 is bent so as to have a large curvature or a small curvature, based on an absolute value of a voltage variation. Accordingly, the first detection signals of the pressure sensors output at the time (t1) when the substrate 110 is bent without a touch being applied may be the adjusting signals, as shown in FIG. 6.

FIGS. 8A to 8E illustrate that the larger signal than the reference voltage is output from the second pressure sensor 122 and the smaller signal than the reference voltage is output from the third pressure sensor 123, but the inventive concepts are not limited thereto.

That is, according to the configuration of the detection circuit detecting the signals output from the pressure sensors 120, the signal smaller than the reference voltage may be output from the second pressure sensor 122 and the signal larger than the reference voltage may be output from the third pressure sensor 123. Further, the value of the signal may be changed according to whether the pressure sensors 120 are positioned on or under the substrate 110.

Hereinafter, a method of compensating for an intensity of pressure of a touch by referring to the bent form of the substrate 110 according to one or more exemplary embodiments is described with reference to FIGS. 9A to 9E.

FIGS. 9A to 9E are graphs illustrating an example of a waveform of a compensated driving voltage according to the principles of the invention. That is, FIGS. 9A to 9E are waveforms representing driving voltages input to the pressure sensor at the time (t2) when a touch is applied to the substrate 110, and the substrate 110 is bent as shown in FIG. 7. Accordingly, the second detection signals of the pressure sensors output at the time (t2) when a touch is applied to the substrate 110 may be distinguished from the first detection signals illustrated in FIGS. 8A to 8E. Particularly, a method of compensating for the intensity of pressure of the touch when the substrate 110 is bent as illustrated in FIG. 7 is described.

According to the principles of the invention, it is possible to compensate for the intensity of pressure of the touch by adjusting the level of the driving voltage.

Figure 9A:
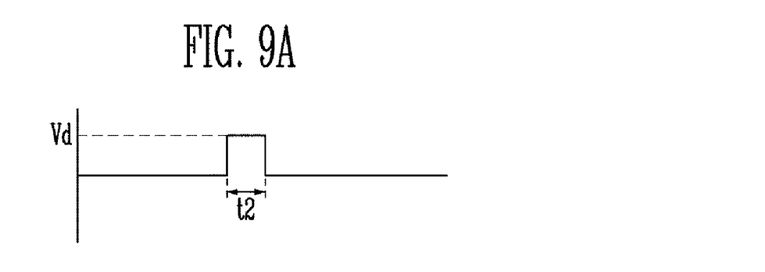
FIGS. 9A to 9E are graphs illustrating an example of a waveform of a compensated driving voltage according to the principles of the invention.

FIG. 9A represents a driving voltage supplied to the first pressure sensors 121, and the driving voltage may be the first driving voltage Vd illustrated in FIG. 6 as a reference driving voltage.

Figure 9B:
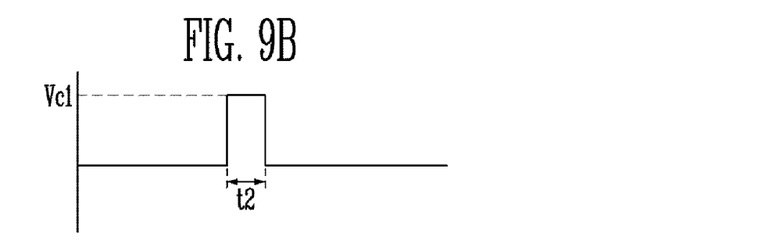
Figure 9C:
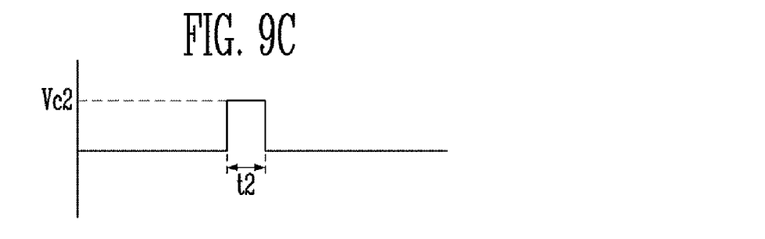

Next, FIGS. 9B and 9C represent driving voltages supplied to the second pressure sensors 122. The driving voltages supplied to the second pressure sensors 122 may be the second driving voltage illustrated in FIG. 6 as a first compensated voltage Vc1 and a second compensated voltage Vc2, respectively.

As illustrated in FIGS. 9A to 9E, the first compensated voltage Vc1 or the second compensated voltage Vc2 has a larger value than that of the reference driving voltage Vd. That is, as a level of the driving voltage is increased, the level of the detection signals, which are detected and output by the second pressure sensors 122, may also be increased by the amount of increase of the driving voltage. As already explained above, the intensity of touch may be in proportion to pressure and contact area. Accordingly, even though a contact area between the substrate 110 and the finger 400 is decreased, the driving voltage applied to the second pressure sensors 122 is increased, so that the detection signal from the second pressure sensors 122 may be compensated. Thus, the intensity of touch, which is finally calculated by the calculating unit 134, may not be decreased.

Further, the level of the driving voltage supplied to the second pressure sensors may be changed according to the curvature of the convexly bent area.

FIG. 9B represents a first compensated driving voltage supplied to the second pressure sensors 122a positioned in the first sub convex area SBA1a, and FIG. 9C represents a second compensated driving voltage supplied to the second pressure sensors 122b positioned in the second sub convex area SBA1b.

Referring to FIGS. 9B and 9C, the first compensated driving voltage Vc1 is larger than the second compensated driving voltage Vc2.

That is, the pressure sensor positioned in the convex area having a larger curvature may receive a driving voltage having a larger value.

Figure 9D:
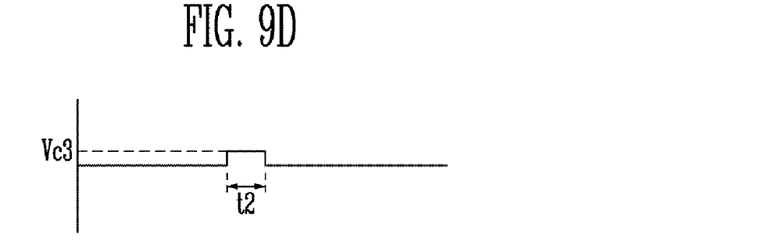
Figure 9E:
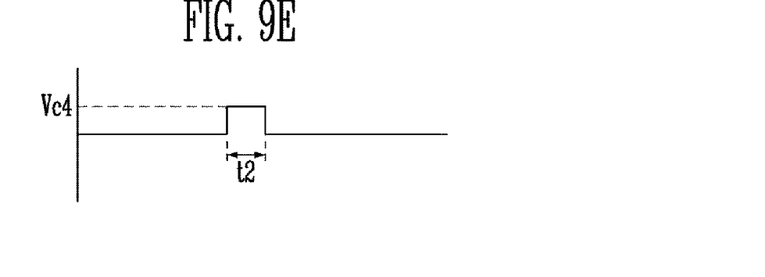

Next, FIGS. 9D and 9E represent driving voltages supplied to the third pressure sensors 123. The driving voltages supplied to the third pressure sensors 123 may be a third compensated driving voltage Vc3 or a fourth compensation driving voltage Vc4.

As illustrated in FIGS. 9A to 9E, the third compensated voltage Vc3 or the fourth compensation driving voltage Vc4 has a smaller value than that of the reference driving voltage Vd. That is, as a level of the driving voltage is decreased, the level of the detection signals, which are detected and output by the third pressure sensors 123, may also be decreased by the amount of decrease of the driving voltage. As already explained above, the intensity of touch may be in proportion to pressure and contact area. Accordingly, even though a contact area between the substrate 110 and the finger 400 is increased, the driving voltage applied to the third pressure sensors 123 is decreased, so that the detection signal from the third pressure sensors 123 may be compensated. Thus, the intensity of touch, which is finally calculated by the calculating unit 134, may not be increased.

Further, level of the driving voltage supplied to the third pressure sensors 123 may be changed according to the curvature of the concavely bent area.

FIG. 9D represents the compensated driving voltage supplied to the third pressure sensors 123a positioned in the first sub concave area SBA2a, and FIG. 9E represents the compensated driving voltage supplied to the third pressure sensors 123b positioned in the second sub concave area SBA2b.

Referring to FIGS. 9D and 9E, the third compensated driving voltage Vc3 is smaller than the fourth compensated driving voltage Vc4.

That is, the pressure sensor positioned in the concave area having a larger curvature may receive a driving voltage having a smaller value.

As described above, the intensity of touch may be calculated in consideration of the contact area of the touch sensor 100 and the finger 400 and the pressure.

However, when the substrate 110 is bent, the contact area between the touch sensor 100 and the finger 400 is different according to the direction and the degree of bending, thereby generating an error during the calculation of the intensity of pressure of the touch.

According to one or more exemplary embodiments, as described with reference to FIGS. 9A to 9E, it is possible to offset an error by the contact area by applying a larger driving voltage to the pressure sensor 122 positioned in the area (that is, the convexly bent area BA1), in which the contact area is decreased, and applying a smaller driving voltage to the pressure sensor 123 positioned in the area (that is, the concavely bent area BA2), in which the contact area is increased.

Accordingly, it is possible to calculate the intensity of touch without being influenced by the shape of the substrate 110.

Next, a method of compensating for the intensity of touch according to another exemplary embodiment of the invention will be described.

According to another exemplary embodiment, when the substrate is bent, the calculating unit 134 may compensate for the intensity of touch by using a correction constant. In this case, a value of the correction constant may be differently applied according to the direction and the degree of bending of the substrate 110.

In an example case where the substrate 110 is bent as illustrated in FIG. 7, when a touch is applied to the flat area PA, the first pressure sensors 121 detect the touch. In this case, the calculating unit 134 may calculate the intensity of touch by referring to the detection signals (second detection signals) of the first pressure sensor 121, and may not perform a separate correction on the calculated intensity of touch.

In contrast to this case, when the touch is applied to the convexly bent area BA1, the second pressure sensors 122 detect the touch. In this case, the calculating unit 134 calculates the intensity of touch by referring to the detection signals (second detection signals) of the second pressure sensor 122, and calculates a final intensity of touch by correcting a value of the intensity of touch to be increased by using a correction constant.

Further, the value of the correction constant may be changed according to the curvature of the convexly bent area. That is, the correction constant used by the calculating unit 134 when the touch is applied to the first sub convex area SBA1a may be larger than the correction constant used by the calculating unit 134 when the touch is applied to the second sub convex area SBA1b.

Next, when the touch is applied to the concavely bent area BA2, the third pressure sensors 123 detect the touch. In this case, the calculating unit 134 calculates the intensity of touch by referring to the detection signals (second detection signals) of the third pressure sensor 123, and calculates a final intensity of touch by correcting a value of the intensity of touch to be decreased by using a correction constant.

Further, the value of the correction constant may be changed according to a curvature of the concavely bent area. That is, the correction constant used by the calculating unit 134 when the touch is applied to the first sub concave area SBA2a may be smaller than a correction constant used by the calculating unit 134 when the touch is applied to the second sub convex area SBA2b.

While the pressure sensors 120 have been described as pressure sensors detecting a pressure by using the variable resistance factor 1230, the inventive concepts are not limited thereto. For example, the touch sensor according to one or more exemplary embodiments may also include a pressure sensor detecting a pressure by using a variation of capacitance.

Hereinafter, a pressure sensor according to another exemplary embodiment of the invention and a method of operating the same will be described.

Figure 10A:
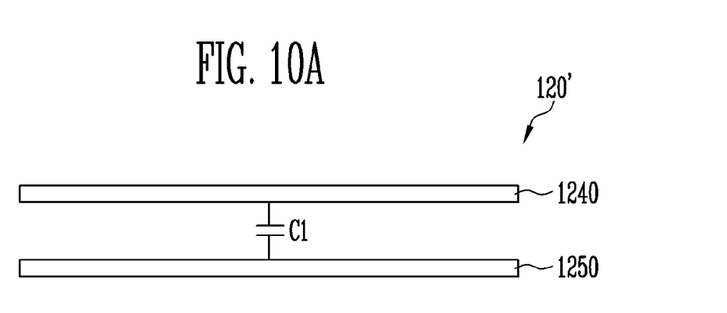
FIGS. 10A and 10B are simplified, cross-sectional views of another embodiment of the pressure sensor of the invention illustrating an exemplary operation of the pressure sensor.
Figure 10B:
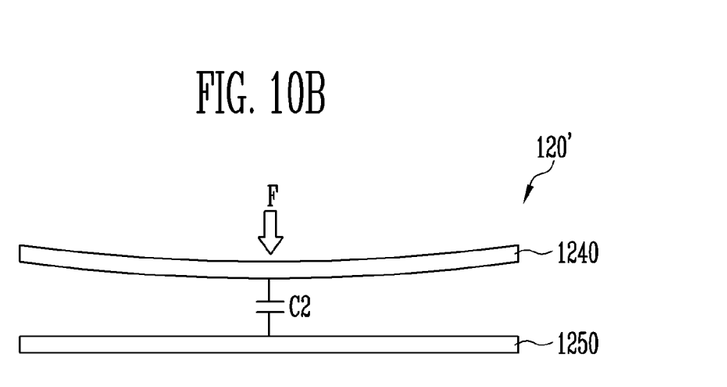

FIGS. 10A and 10B are simplified, cross-sectional views of another embodiment of the pressure sensor of the invention illustrating an exemplary operation of the pressure sensor.

Referring to FIG. 10A, a pressure sensor 120' may include a first conductor 1240 and a second conductor 1250.

The first conductor 1240 and the second conductor 1250 may be spaced apart from each other.

Further, a separate constituent element may be positioned between the first conductor 1240 and the second conductor 1250.

The first conductor 1240 and the second conductor 1250 include a conductive material. In one or more exemplary embodiments, the conductive material may include a metal or an alloy thereof. The metal may include gold (Au), silver (Ag), aluminum (Al), molybdenum (Mo), chrome (Cr), titanium (Ti), nickel (Ni), neodymium (Nd), copper (Cu), platinum (Pt), and the like.

In one or more exemplary embodiments, the first conductor 1240 and the second conductor 1250 may be formed of a transparent conductive material. The transparent conductive material may include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide (SnO2), a carbon nano tube, graphene, and the like. The first conductor 1240 and the second conductor 1250 may be formed of a single layer or multiple layers, for example, multiple layers, in which two or more materials among the materials are laminated.

The first conductor 1240 and the second conductor 1250 are illustrated as having plate shapes in the drawing, but are not limited thereto and may be modified into various shapes.

Further, the second conductor 1250 may be formed of the same material as that of the first conductor 1240 or the second conductor 1250 and the first conductor 1240 may be formed of different materials.

In the meantime, FIG. 10A illustrates a state where a pressure F is not applied to the sensor 120', and FIG. 10B illustrates a state where the pressure F is applied to the sensor 120'.

Referring to FIG. 10A, when the pressure F is not applied to the pressure sensor 120', a first capacitance C1 may be formed between the first conductor 1240 and the second conductor 1250.

Referring to FIG. 10B, when the pressure F is applied to the pressure sensor 120' according to a touch of a user and the like, the distance between the first conductor 1240 and the second conductor 1250 may be changed, and thus, the capacitance between the first conductor 1240 and the second conductor 1250 may be changed. For example, the first capacitance C1 may be changed to second capacitance C2 by the applied pressure F.

As a result, the mutual capacitance between the first conductor 1240 and the second conductor 1250 may be changed in response to the applied pressure F.

Figure 11A:
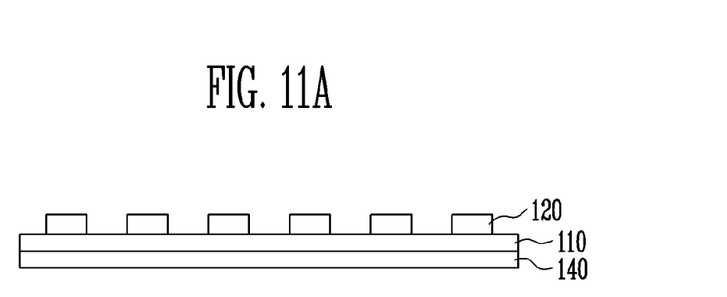
FIG. 11A is a simplified, cross-sectional view schematically illustrating another embodiment of touch sensor including a supporting film constructed according to the principles of the invention.
Figure 11B:
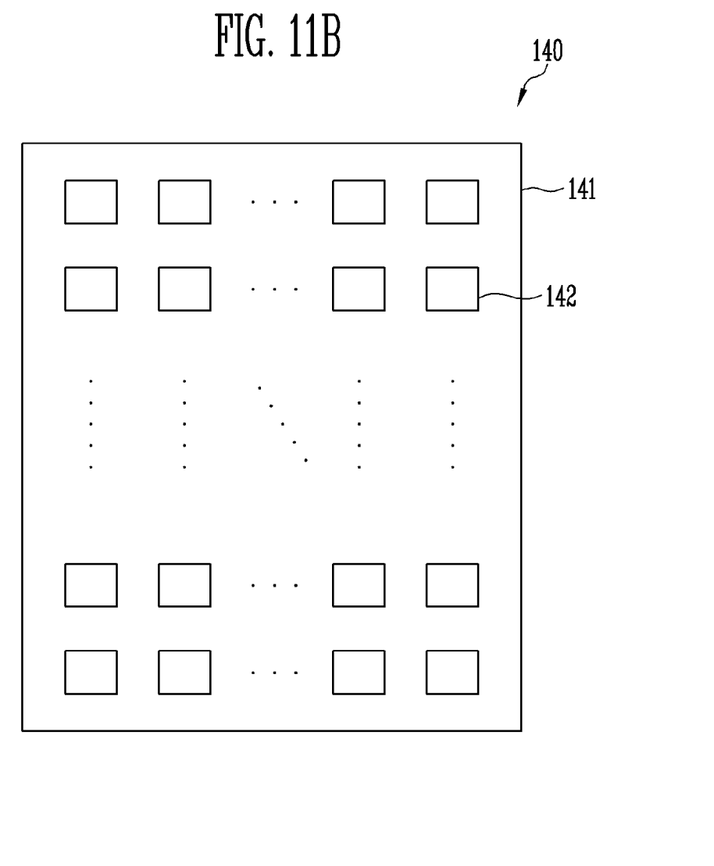
FIG. 11B is a plan view illustrating the supporting film illustrated in FIG. 11A.
Figure 11C:
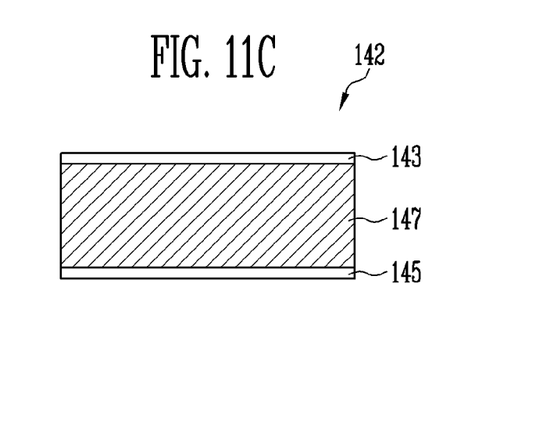
FIG. 11C is a simplified, cross-sectional view illustrating a configuration of a unit cell illustrated in FIG. 11B.

FIG. 11A is a simplified, cross-sectional view schematically illustrating another embodiment of touch sensor including a supporting film constructed according to the principles of the invention, FIG. 11B is a plan view illustrating the supporting film illustrated in FIG. 11A, and FIG. 11C is a simplified, cross-sectional view illustrating a configuration of a unit cell illustrated in FIG. 11B.

Referring to FIG. 11A, the touch sensor may include a substrate 110 and pressure sensors 120 positioned on one surface of the substrate 110, and may further include a supporting film 140 positioned on another surface of the substrate 110. As illustrated in FIG. 11A, the supporting film 140 may be positioned on a lower surface of the substrate 110, or may also be positioned on an upper surface of the substrate 110.

The supporting film 140 may perform the function of maintaining a transformed form of the substrate 110 even though the substrate 110 is transformed to a bent form by a predetermined force and then the force is removed or not continuously applied any longer.

Referring to FIG. 11B, the supporting film 140 may include an insulating layer 141, and a plurality of unit cells 142 positioned on one surface of the insulating layer 141.

Referring to FIG. 11C, the unit cell 142 may include a first electrode 143, a second electrode 145, and a fluid layer 147 provided between the first electrode 143 and the second electrode 145.

The first electrode 143 includes a conductive material. In one or more exemplary embodiments, the conductive material may include a metal or an alloy thereof. The metal may include gold (Au), silver (Ag), aluminum (Al), molybdenum (Mo), chrome (Cr), titanium (Ti), nickel (Ni), neodymium (Nd), copper (Cu), platinum (Pt), and the like.

In one or more exemplary embodiments, the first electrode 143 may be formed of a transparent conductive material. The transparent conductive material may include a silver nano wire (AgNW), an Indium Tin Oxide (ITO), an Indium Zinc Oxide (IZO), an Antimony Zinc Oxide (AZO), an Indium Tin Zinc Oxide (ITZO), a Zinc Oxide (ZnC), a Tin Oxide (SnO2), a carbon nano tube, graphene, and the like.

The first electrode 143 is illustrated in a plate shape in the drawing, but is not limited thereto and may be modified into various shapes. For example, the first electrode 143 may have stripe shapes connected with one another or one or more mesh shapes.

Next, the second electrode 145 is spaced apart from the first electrode 143, and includes a conductive material. The conductive material may be selected from the materials of the first electrode 143, and may be formed of the same material as that of the first electrode 143 or a different material from that of the first electrode 143.

The second electrode 145 is also illustrated in a plate shape in the drawing, but is not limited thereto and may be modified into various shapes. For example, the second electrode 145 may have stripe shapes connected with one another and intersecting the first electrode 143 or one or more mesh shapes.

Next, the fluid layer 147 is a smart fluid, and includes a material having a fluid property (for example, viscosity or elasticity) which is changed by an electric field or a magnetic field.

Particularly, the fluid layer 147 may be a typical electro-rheological fluid, in which polymer particles having chemically treated surfaces, inorganic particles, or functionally coating-processed particles are dispersed in a non-conductive solvent, or a typical magneto-rheological fluid, in which paramagnetic particles are dispersed in a solvent having low permeability.

A wire, through which a voltage may be applied, may be connected to the first electrode 143 and the second electrode 145.

When the unit cells 142 are driven by applying a voltage to the first electrode 143 and the second electrode 145, the fluid layer 147 is hardened, and when the driving is stopped, the fluid layer 147 becomes flexible again.

That is, when the unit cells are driven after bending the substrate 110 into a desired shape, the substrate 110 may not be restored to an original state.

The shape of the unit cells 142, the arrangement of the unit cells 142, and the like are not limited to FIGS. 11A and 11B, but may be variously changed.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A touch sensor, comprising:
a flexible substrate capable of being bent into a shape having a flat area, a convexly bent area, and a concavely bent area;
a plurality of pressure sensors provided on the substrate, the plurality of pressure sensors including a first pressure sensor positioned in the flat area, a second pressure sensor positioned in the convexly bent area, and a third pressure sensor positioned in the concavely bent area; and
a sensor controller to determine, when a touch is input on the substrate, a bent form of the substrate at which point the touch is input by using a first detection signal obtained from at least one of the first, second, and third pressure sensors and to compensate for an intensity of the touch based on the bent form of the substrate at which point the touch is input.

2. The touch sensor of claim 1, wherein
the sensor controller is configured to receive the first detection signal output from the at least one of the first, second, and third pressure sensors and to obtain information relating at least one of an amount of curvature and a bending direction of the substrate from the first detection signal.

3. The touch sensor of claim 2, wherein
the sensor controller is further configured to:
supply a driving voltage to the plurality of pressure sensors, and
compensate the driving voltage based upon the information relating to at least one of the amount of curvature and the bending direction of the substrate.

4. The touch sensor of claim 3, wherein
the sensor controller is configured to supply a reference driving voltage to the first pressure sensor positioned in the flat area of the substrate.

5. The touch sensor of claim 4, wherein
the sensor controller is configured to supply a first compensated driving voltage to the second pressure sensor positioned in the convexly bent area of the substrate, and the first compensated driving voltage is larger than the reference driving voltage.

6. The touch sensor of claim 5, wherein
the convexly bent area includes a first sub area having a first curvature and a second sub area having a second curvature smaller than the first curvature, and
the sensor controller is configured to supply a first compensated driving voltage to the first sub area and the second sub area with the first compensated driving voltage supplied to the first sub area being larger than that supplied to the second sub area.

7. The touch sensor of claim 4, wherein
the sensor controller is configured to supply a second compensated driving voltage to the third pressure sensor positioned in the concavely bent area of the substrate, and the second compensated driving voltage is smaller than the reference driving voltage.

8. The touch sensor of claim 7, wherein
the concavely bent area includes a first sub area having a first curvature and a second sub area having a second curvature smaller than the first curvature, and
the sensor controller is configured to supply a second compensated driving voltage the first sub area and to the second sub area with the second compensated driving voltage supplied to the first sub area being smaller than that supplied to the second sub area.

9. The touch sensor of claim 4, wherein the sensor controller is configured to determine whether portions of the substrate are flat, concave, or convex.

10. The touch sensor of claim 2, wherein
the sensor controller is further configured to calculate the intensity of touch based upon a second detection signal output from at least one of the first, second, and third pressure sensors, the second detection signal being different from the first detection signal, and to calculate a final intensity of touch based upon a correction constant corresponding to the information relating to at least one of the intensity of touch, the curvature of the substrate, and the bending direction of the substrate.

11. The touch sensor of claim 10, wherein
the substrate is bendable into a convex shape and when a touch is applied to a convexly bent area of the substrate, the intensity of touch is smaller than the final intensity of touch.

12. The touch sensor of claim 10, wherein
the substrate is bendable into a concave shape and when the touch is applied to the concavely bent area of the substrate, the intensity of touch is larger than the final intensity of touch.

13. The touch sensor of claim 1, further comprising:
a supporting film provided on the substrate, and including unit cells to maintain the bent form of the substrate.

14. The touch sensor of claim 13, wherein
the unit cell includes:
a first electrode;

a second electrode spaced apart from the first electrode; and a fluid layer provided between the first electrode and the second electrode, and wherein the fluid layer is hardened when a voltage is applied to the first electrode and the second electrode.

* * * * *